Oct. 20, 1964   R. E. KARP   3,153,395
PARACHUTE RELEASE MECHANISM
Filed June 10, 1963   2 Sheets-Sheet 1

INVENTOR.
RAYMOND E. KARP
BY
ATTORNEY.

INVENTOR.
RAYMOND E. KARP

# United States Patent Office 3,153,395
Patented Oct. 20, 1964

3,153,395
PARACHUTE RELEASE MECHANISM
Raymond E. Karp, San Marino, Calif., assignor to the United States of America as represented by the Secretary of the Navy
Filed June 10, 1963, Ser. No. 286,872
5 Claims. (Cl. 114—20)
(Granted under Title 35, U.S. Code (1952), sec. 266)

The invention described herein may be manufactured and used by or for the Government of the United States of America for governmental purposes without the payment of any royalties thereon or therefor.

This invention relates to aerial launched torpedoes, and other stores, such as depth charges and the like, which are dropped into the sea, and of the type which are stabilized during their aerial descent by a parachute which is jettisoned when the torpedo or other store impacts the sea.

The U.S. Patent to Bemis, 3,066,632, and the Kilvert patent referred to in the Bemis patent, are examples of the general type of device to which this invention relates, the Bemis patent being an improvement over the Kilvert patent to prevent premature release of the parachute while the missile is being stabilized shortly after release from an aircraft. The apparatus for preventing premature release in the Bemis patent comprises a spring urged piston which expels a liquid through a metering orifice, thus providing fixed time release prevention. In the event the torpedo is not stabilized within such fixed time the torpedo may still be released from the parachute before the torpedo impacts the water as a result of spurious forces acting on the release mechanism after expiration of such time. The release mechanism, moreover, is actuated by inertia forces which exist only for an extremely short interval of time after the torpedo impacts the water. In the event release is not accomplished within this short interval of time, or in the event of malfunctioning of the inertia weight locking detents, the parachute will remain attached to the torpedo, thus disabling its underwater run to its target.

In the use of devices of the type referred to it has been conventional practice to transport the store, such as a torpedo, suspended by an aircraft bomb rack disposed beneath an aircraft wing, the store having affixed to it, a parachute pack containing a parachute. In the normal operation of such apparatus the store and parachute are released from the bomb rack. A static line or lanyard, extending between the parachute pack and aircraft, next initiates opening of the parachute after the store and parachute have dropped a predetermined distance below the aircraft. Malfunctions have occurred, however, and the parachute has opened while the store remained attached to the bomb rack. This, as will be apparent, created a dangerous condition for the aircraft pilot in the maneuver or landing of the aircraft and particularly if he was unable to release the store from the bomb rack. Also, even if the store could be released its jettisoning meant a complete loss of what was usually, as in a torpedo, expensive equipment. To ensure that jettisoning would always occur, in the event of such unauthorized parachute opening, a safety shear device has been employed in the store suspension system which will fail and effect automatic jettisoning of the store and parachute irrespective of pilot demand or operation of the bomb rack release hooks. While this reduced the hazards to the aircraft and its pilot, it still effected a loss of the store, or dropping the store in an undesired zone.

One of the objects of this invention is the provision of parachute release apparatus which, during dropping of a store, prevents premature release of the parachute from the store by rejecting spurious radiation and other signals, which might cause unauthorized release, until the store enters the water, the latter providing the only signal which it will accept to effect release.

Another object is the provision of gas operated release mechanism which operates independent of inertia forces.

A further object is the provision of safety apparatus, forming a part of the release mechanism, for automatically releasing a parachute which opens while the store remains affixed to an aircraft, effecting retention of the store by the aircraft.

Still further objects, advantages and salient features will become more apparent from a consideration of the description to follow, the appended claims, and the accompanying drawing, in which:

Figure 1:
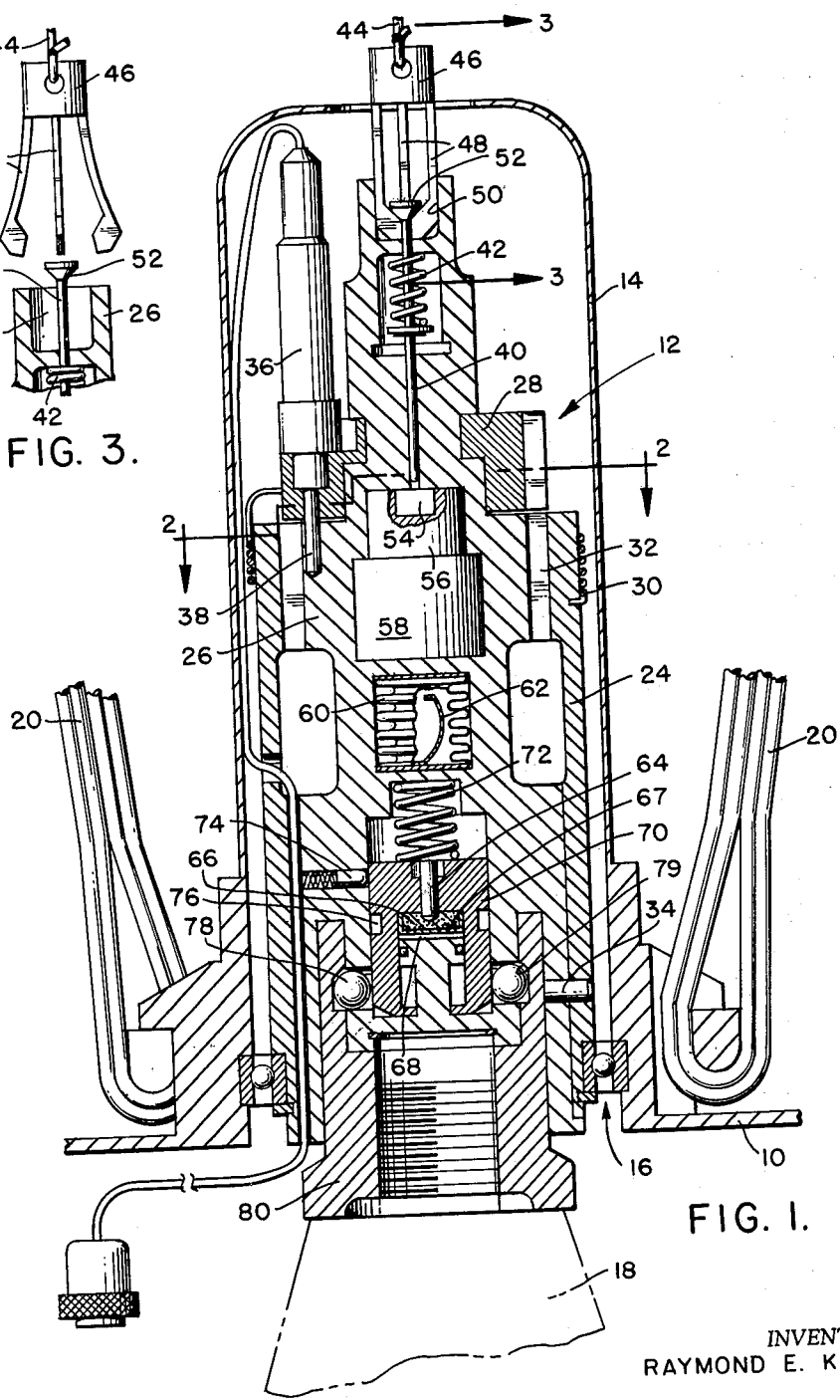
FIG. 1 is a longitudinal section through the portion of a conventional parachute pack which incorporates the subject of the invention.
Figure 2:
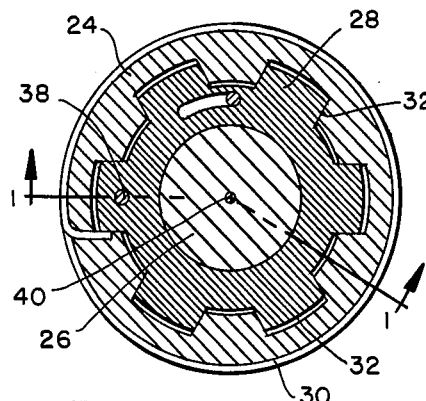
FIG. 2 is a section taken on line 2—2, FIG. 1.

Referring to FIG. 1, parachute pack 10 comprises a cup-shaped canister or housing, like housing 62 of the Bemis patent, provided with a removable end closure (not shown) and containing a parachute and the release apparatus 12 forming the subject of the invention. The release apparatus is disposed within a housing 14, affixed to the closed end of the canister, by a ball bearing 16 which permits torpedo or store 18 to rotate relative to the canister to prevent tangling of parachute shroud lines 20 which connect the canister to a parachute 22.

Ball bearing 16 is of conventional construction, having its outer race secured to housing 14 and its inner race secured to a tubular member 24. A central body member 26 is telescopically disposed within member 24 and has associated with it the major portion of the operative parts. Intermediate its ends, member 26 rotatably supports a male splined member 28, urged in one direction by a coil type torsion spring 30, the ends of which engage members 24 and 28. Member 24 is provided with a mating female spline 32 which may axially slide across male spline 28 in one angular position of the splines but is blocked from sliding when the male spline is rotated or indexed to a blocking position. A safety shear pin 34 extends between members 24 and 26. In the event of unauthorized opening of the parachute, while the store is still attached to the aircraft, opening of the parachute shears pin 34 and permits the parachute, housing 14, bearing 16, and member 24 to detach from the remaining parts of the device, since, at such time, the splines have not yet been indexed to blocking position.

Figure 3:
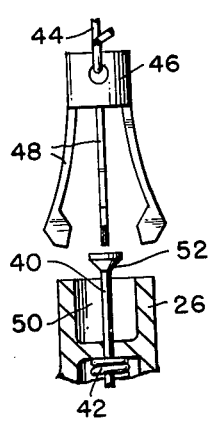
FIG. 3 is a section taken on line 3—3, FIG. 1, showing a different relative position of parts, and FIG. 4 diagrammatically illustrates the invention and its operation.

A firing pin 40, urged by a spring 42, is disposed at one end of member 26 and is releasibly connected to a canopy line 44 by a firing pin engaging member 46 having a plurality of angularly spaced spring fingers 48, disposed in a cylindrical cavity 50 which engage a conical head 52 on the firing pin. When member 46 is pulled by the canopy line it compresses spring 42, cocking the firing pin, and when fingers 48 move outside of the cavity, they spring outwardly, as shown in FIG. 3, releasing the firing pin.

When the firing pin is released it impacts a suitable percussion detonater which ignites a slow burning powder, such pyrotechnic device being conventional and illustrated in its entirety as a battery heater 54. Battery heater 54 now supplies heat to a conventional thermal battery 56 which generates voltage. Battery 56 is series connected to a spurious signal switch 58 which will reject all signals except a predetermined signal. Such devices are conventional, exemplary of which is the Spurious Radiation Switch P/N 700–100, manufactured by Space Recovery Systems, El Segundo, California. Such device rejects all sinusoidal radio frequency signals, certain square wave signals, certain D.C. pulses, pulsed R-F signals of the type typical of radars and pulsed radio beacons, certain "spikes," and signals beneath predetermined voltage.

The apparatus for permitting indexing of spline member 28 to blocking position comprise a pin puller 36, carried by male spline member 28, having a pin 38 which engages in a mating aperture in member 26. When the pin is pulled (upwardly as viewed in FIG. 1), spring 30 rotates or indexes the male spline member to its blocking position relative to the female spline. When in such position, shear pin 34 is precluded from shearing, the forces between the parachute and store now being applied across ends of the misaligned or indexed splines. The pin puller may be of any type desired, an example of which is the commercially available Pin Puller, model OA–A4, Drawing C129–1, as supplied by Ordinance Associates, Inc., South Pasadena, California. This device employs an electrically initiated squib which produces gas to move the pin to a retracted position at which position it is locked against retrograde movement by a suitable detent.

Figure 1A:
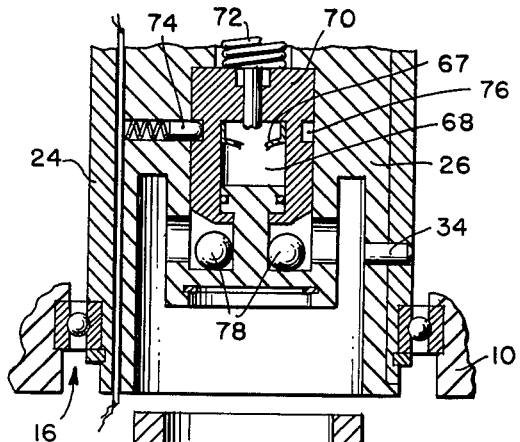
FIG. 1A is a section, like FIG. 1, showing a different relative position of parts.

The only signal which may pass through the spurious signal switch is provided by a hydrostat 60 which carries a switch 62. When water pressure is supplied to one end of the hydrostat and sustained for over a predetermined interval of time, closing of switch 62 passes current from thermal battery 56, through spurious switch 58, through hydrostat switch 62 to an electric squib 64. Ignition of squib 64 ignites powder 66, rupturing diaphragm 67, and delivering gas to chamber 68, which forces piston 70 from the position shown in FIG. 1 to the position shown in FIG. 1A against the urge of a spring 72. If desired, a spring urged detent 74, engageable in a groove 76 in the piston, may be provided for locking the piston in the position shown in FIG. 1A. As shown in FIG. 1, piston 70 blocks radial inward movement of locking balls 78 which engage in a groove 79 in a nut 80 affixed to the store but when it moves to the position of FIG. 1A the balls are free to be cammed inwardly and release the store and its attached nut from the remaining apparatus. The latter action occurs shortly after the store enters the water, water pressure being applied through any suitable conduits to hydrostat 60.

Figure 4:
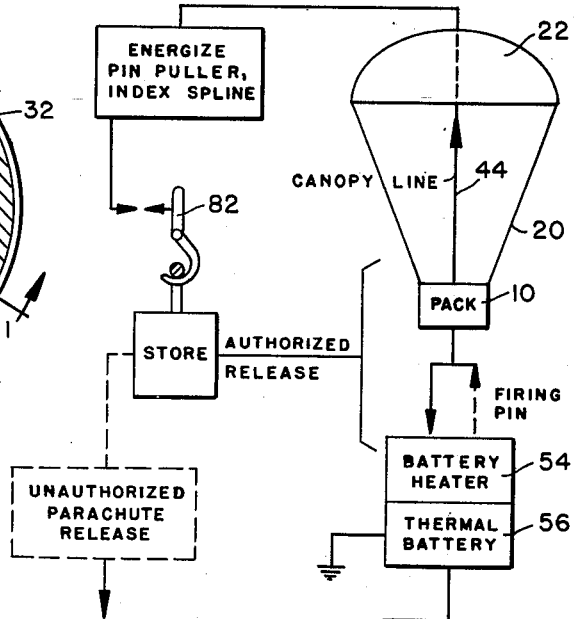

Referring, now, to FIG. 4, it will first be assumed that the parachute opens while the store is still attached to the aircraft. In the prior art, the drag of the parachute would have sheared shear pins on the store suspension apparatus and both the parachute and the attached store would be jettisoned. With the present invention, no shear device between the store and its suspension apparatus would normally be necessary and hence the store will normally remain affixed to the aircraft. As an added safety measure, however, for the remote possibility of a jamming of parts which would prevent member 24 from releasing from member 26, even though pin 34 shears, the prior art shear device on the store suspension may also be employed. In such case it would be so constructed to shear under greater force than required to shear pin 34. Thus, only in the remote possibility referred to would both the store and parachute be released together as was conventional practice in the prior art. With exception to this remote possibility, only pin 34 will shear, releasing the parachute but retaining the store attached to the aircraft.

In the most simple form of circuitry the pin puller 36 may be actuated simultaneously with an electric signal calling for operation of a release hook 82 which supports the store. The sequence of operations are then:

(1) Index spline as torpedo and pack fall from aircraft, (2) open parachute by static line or other mode, (3) cock and release firing pin as canopy approaches full open position, (4) further sequence as previously described, the spurious switch rejecting all signals except sustained closing of switch 62 by hydrostat 60 when the store penetrates the water.

With simultaneous actuation of the release hook and pin puller, as just described, there is a remote possibility that the pin puller might be actuated but the release hook not actuated. If for some reason the parachute should later open accidently, it could not release from the store since the rotatable spline member would now preclude such release. To obviate this possible malfunction, the pin puller may be energized only in response to full opening of the hook, as shown in FIG. 4, so that indexing of the spline member may occur only if the store and its attached pack separate from the aircraft.

While the apparatus so far described is of particular utility for dropping stores into the sea, since separation is effected by hydrostatic pressure, it will be apparent that it may be employed for dropipng stores onto land by substituting a spring urged inertia weight switch for the hydrostat, preferably of the type in which a detent is employed to lock the switch in actuated position after the inertia weight responds to impact of the store with the land.

Obviously many modifications and variations of the present invention are possible in the light of the above teachings. It is therefore to be understood that within the scope of the appended claims the invention may be practiced otherwise than as specifically described.

What is claimed is:

1. In apparatus for releasably securing a trailing parachute to an aircraft dropped store, of the type having a mechanical release device adapted to normally release the parachute from the store substantially at the termination of descent of the store and trailing parachute, the improvements, in combination, comprising;
   (a) separable members forming parts of said release apparatus,
   (b) said separable members being secured together with a safety member,
   (c) said safety member being so constructed to permit said separable members to separate in event of abnormal opening of the parachute while the store remains affixed to the aircraft, to thereby permit release of the parachute, while retaining the store affixed to the aircraft,
   (d) a locking member for rendering said safety member ineffective to permit separation of said separable members when the store and affixed parachute are normally released together from the aircraft,
   (e) an electrically initiated pyrotechnic device for actuating said mechanical release device,
   (f) an electric thermal type battery forming a part of the apparatus for supplying electrical energy to the pyrotechnic device,
   (g) a separation switch for electrically connecting the battery and pyrotechnic device, operable substantially at the termination of descent,
   (h) a pyrotechnic source of heat for said battery, and
   (i) means operable in response to opening of the parachute for initiating operation of the pyrotechnic source of heat.

2. Apparatus in accordance with claim 1 wherein the means operable in response to opening of the parachute comprises;
   (j) a percussion device for initiating operation of the pyrotechnic source of heat,
   (k) a spring urged firing pin for impacting the percussion device,
   (l) and a line connecting the firing pin to the parachute canopy for energizing the firing pin spring and thence releasing the firing pin.

3. In apparatus for releasibly securing a trailing parachute to an aircraft dropped store, of the type having a mechanical release device adapted to normally release the parachute from the store substantially at the termination of descent of the store and trailing parachute, the improvements, in combination, comprising;
- (a) separable members forming parts of said release apparatus,
- (b) said separable members being secured together with a safety member,
- (c) said safety member being so constructed to permit said separable members to separate in event of abnormal opening of the parachute while the store remains affixed to the aircraft, to thereby permit release of the parachute, while retaining the store affixed to the aircraft,
- (d) a locking member for rendering said safety member ineffective to permit separation of said separable members when the store and affixed parachute are normally released together from the aircraft,
- (e) an electrically initiated pyrotechnic device for actuating said mechanical release device,
- (f) an electric battery forming a part of the apparatus for supplying electrical energy to the pyrotechnic device,
- (g) a separation switch for electrically connecting the battery and pyrotechnic device, operable substantially at the termination of descent, and
- (m) a spurious signal switch forming a part of the apparatus, adapted to prevent initiation of said pyrotechnic device by said battery during the entire descent of the store and parachute, but operable thereafter to permit initiation of said pyrotechnic device in response to operation of said separation switch, 4. In apparatus for releasibly securing a trailing parachute to an aircraft dropped store, of the type having a mechanical release device adapted to normally release the parachute from the store substantially at the termination of descent of the store and trailing parachute, the improvements, in combination, comprising;
- (a) separable members forming parts of said release apparatus,
- (b) said separable members being secured together with a safety member,
- (c) said safety member being so constructed to permit said separable members to separate in event of abnormal opening of the parachute while the store remains affixed to the aircraft, to thereby permit release of the parachute, while retaining the store affixed to the aircraft,
- (d) a locking member for rendering said safety member ineffective to permit separation of said separable members when the store and affixed parachute are normally released together from the aircraft,
- (e) an electrically initiated pyrotechnic device for actuating said mechanical release device,
- (f) an electric battery forming a part of the apparatus for supplying electrical energy to the pyrotechnic device,
- (g) a separation switch for electrically connecting the battery and pyrotechnic device, operable substantially at the termination of descent, and
- (n) a hydrostat for operating said separation switch.

5. In apparatus for releasibly securing a trailing parachute to an aircraft dropped store, of the type having a mechanical release device adapted to normally release the parachute from the store substantially at the termination of descent of the store and trailing parachute, the improvements, in combination, comprising;
- (a) separable members forming parts of said release apparatus,
- (b) said separable members being secured together with a safety member,
- (c) said safety member being so constructed to permit said separable members to separate in event of abnormal opening of the parachute while the store remains affixed to the aircraft, to thereby permit release of the parachute, while retaining the store affixed to the aircraft,
- (d) a locking member for rendering said safety member ineffective to permit separation of said separable members when the store and affixed parachute are normally released together from the aircraft,
- (o) said locking member being rotatable between a first index position permitting separation of said separable members and a second index position positively blocking separation of said separable members,
- (p) releasable means for retaining said locking member in said first index position,
- (q) means for actuating the releasable means to a release position, and
- (r) a spring for rotating said locking member to said second index position.

References Cited in the file of this patent
UNITED STATES PATENTS

| 2,650,127 | Carlson | Aug. 25, 1953 |
| 2,942,911 | Stott | June 28, 1960 |

FOREIGN PATENTS

| 118,090 | Australia | Feb. 2, 1944 |